US006574582B1

United States Patent
Geiger

(10) Patent No.: US 6,574,582 B1
(45) Date of Patent: Jun. 3, 2003

(54) ELECTRONIC CALIPERS HAVING SCALING, NOMINAL-VALUE LOOK-UP, AND GEOMETRIC-CALCULATION FUNCTIONS

(76) Inventor: Richard T. Geiger, 6343 N. Berkeley Blvd., Whitefish Bay, WI (US) 53217

( * ) Notice: Subject to any disclaimer, the term of this patent is extended or adjusted under 35 U.S.C. 154(b) by 0 days.

(21) Appl. No.: 09/841,508

(22) Filed: Apr. 23, 2001

Related U.S. Application Data

(63) Continuation of application No. 09/141,870, filed on Aug. 27, 1998, now Pat. No. 6,223,136.
(60) Provisional application No. 60/057,051, filed on Aug. 27, 1997.

(51) Int. Cl.$^7$ ................................................ G01B 5/12
(52) U.S. Cl. ........................ 702/162; 702/158; 702/154; 33/1 L
(58) Field of Search ................................ 702/162, 158, 702/154, 161, 164; 33/1 L, 700, 819, 773, 784

(56) References Cited

U.S. PATENT DOCUMENTS

| | | | |
|---|---|---|---|
| 4,566,199 A | * 1/1986 | Gruhler et al. | 33/784 |
| 4,941,267 A | * 7/1990 | Miller, Jr. | 33/700 |
| 5,067,249 A | * 11/1991 | Terrigno | 33/773 |
| 5,317,814 A | * 6/1994 | Rogler | 33/810 |
| 6,223,136 B1 | * 4/2001 | Geiger | 702/158 |

* cited by examiner

*Primary Examiner*—Kamini Shah
(74) *Attorney, Agent, or Firm*—Carol D. Titus; James J. Leary

(57) ABSTRACT

An improved set of calipers or dividers having a pair of measurement jaws for measuring the distance between points, a display, and a calculation module which performs calculations or retrieves values for any one or more of the following functions: scaling, nominal values, basic geometry, and complex geometry. The scaling function is performed in one of two ways: numerical input or a calculated scaling factor. The nominal values function displays the nominal value which corresponds to the measured value of any preprogrammed table of values. Common tables would include tables of drill sizes, wire gauge, sheet metal gauge, screw size, font size, paper weight, hole size, etc. The basic geometry function calculates geometric values based on one or more measured inputs. For example, the user can measure the opposite and adjacent legs of a triangle and the caliper will calculate and display the angle. With the complex geometry function, the user can input measured inputs and obtain exact or approximate values for more complicated formulas such as area, moments of inertia, approximate area under a curve. For embodiments where the user is prompted for information on a pictorial display, a larger display is used to allow for the pictorial image.

18 Claims, 3 Drawing Sheets

ELECTRONIC CALIPERS HAVING SCALING, NOMINAL-VALUE LOOK-UP, AND GEOMETRIC-CALCULATION FUNCTIONS

CROSS-REFERENCE TO OTHER APPLICATIONS

The present application is a continuation of U.S. application Ser. No. 09/141,870, filed Aug. 27, 1998, now U.S. Pat. No. 6,223,136, issued Apr. 24, 2001, which claims the benefit of U.S. Provisional Patent Application No. 60/057,051, filed Aug. 27, 1997, which are hereby incorporated by reference in their entirety.

BACKGROUND-FIELD OF INVENTION

The present invention relates to electronic calipers. More particularly, the present invention relates to electronic calipers having multiple function modes, each mode allowing the user to perform a basic mathematical or geometric calculation, such as scaling the measurement by a chosen value, providing a nominal value corresponding to the physical measurement, and/or utilizing physical measurements in geometric formulas to determine other calculable values.

BACKGROUND OF THE INVENTION

Most calipers currently in use are designed for inspection of existing parts and materials. This is optimal for occupations such as inspector, machinist or fabricator, where the user wants to verify a particular dimension, wants to know a dimension for design of a corresponding part, etc. However, engineers, designers, architects, and pattern makers frequently have different needs. When creating a new part, important information may be obtained for alternate sources, including drawings, catalogues, facsimiles, and photographs. Since, many of these sources are not printed in a known scale and/or rarely have all the necessary dimensions, the user must make repetitive manual calculations using a calculator, a machinists handbook, protractor, an architects scale and a caliper to obtain the desired or necessary values for the new part.

Some prior art device have attempted to overcome some of these limitations. For example, U.S. Pat. No. 4,435,904 to Logan et al. describes an automated measuring scale which aids a user in scaling values by allowing a user to input a scale factor and a scaled number. When the system is then activated, the device automatically moves the index member an amount which is scaled by the scale factor.

U.S. Pat. No. 5,067,249 to Terrigno calculates the number of miles along a path by scaling the distance a rolling disk travels on a map by the corresponding map scale These prior art devices are limited to a basic scaling of a particular measured distance by an entered scale factor. Therefore, there is a clear need in the industry for a device which is more versatile and allows a user to calculate the scale factor, calculate other values based on measured parameters, display alternate nominal values such as wire or sheet gauge, paper weight, etc. which correspond to a measured value, and measure values which are automatically input into geometric formulas and used to calculate resulting values.

SUMMARY OF THE INVENTION

Accordingly, the object of the present invention is to provide an electronic caliper or divider which can convert physical measurements by chosen parameter(s) to calculate and/or display chosen or nominal values while maintaining the ease-of-use, simplicity and elegance of current digital calipers. The present invention is particularly designed to calculate and display scaled values from either an input or a calculated scale factor; display a nominal value corresponding to a measured value such as, wire gauge, sheet metal gauge, paper weight, etc.; a value calculated from a simple geometric function, such as area, radius, angle, perimeter, volume, etc.; or an exact or approximate value calculated from a more complex geometric function, such as moment of inertia, area under a curve, areas of more complex shapes, etc.

In keeping with the forgoing discussion, the present invention takes the form of a set of calipers having a pair of measurement jaws for measuring the distance between points, a display and a calculation module which performs calculations or retrieves values for any one or more of the following functions: scaling, nominal values, basic geometry, and complex geometry.

The scaling function is performed in one of two ways: numerical input or a calculated scaling factor. The numerical input is for cases where the drawings, model, or item to be measured is of a known scale. The user inputs that scale. Further measurements are then multiplied by this scale factor and displayed. The calculated scaling factor is for cases in which the user is uncertain of the scale, but has a reference dimension. In this case, the user measures the reference dimension, then inputs the value corresponding to the actual dimension of the object. The calculation module then calculates the scale factor and scales further measurements by the scale factor.

The nominal values function displays the nominal value which corresponds to the measured value of any preprogrammed group. Common groups would include tables of drill sizes, wire gauge, sheet metal gauge, screw size, font size, paper weight, hole size, etc. Optimally, this function also displays nominal values for manually input values or scaled values.

The basic geometry function calculates geometric values based on one or more measured inputs. For example, the user can measure the opposite and adjacent legs of a triangle and the caliper will calculate and display the angle. Geometry functions can be programmed for radius, angle, area, perimeter, volume, etc. These measurements could be measured in many units, inch, metric, and scaled.

With the complex geometry function, the user can input measured inputs and obtain exact or approximate value for more complicated values such as area, moments of inertia, area under a curve, etc. The caliper may be designed to display in pictorial form different items, like an I-beam. The user can then measure different values as the caliper prompts the user for specific measurements. When all the measured inputs have been entered, the caliper will display the results. Again, many units can be used, inch, metric, or scaled. For embodiments where the user is prompted for information on a pictorial display, a larger display is used to allow for the pictorial image.

DETAILED DESCRIPTION OF THE INVENTION

Figure 1:
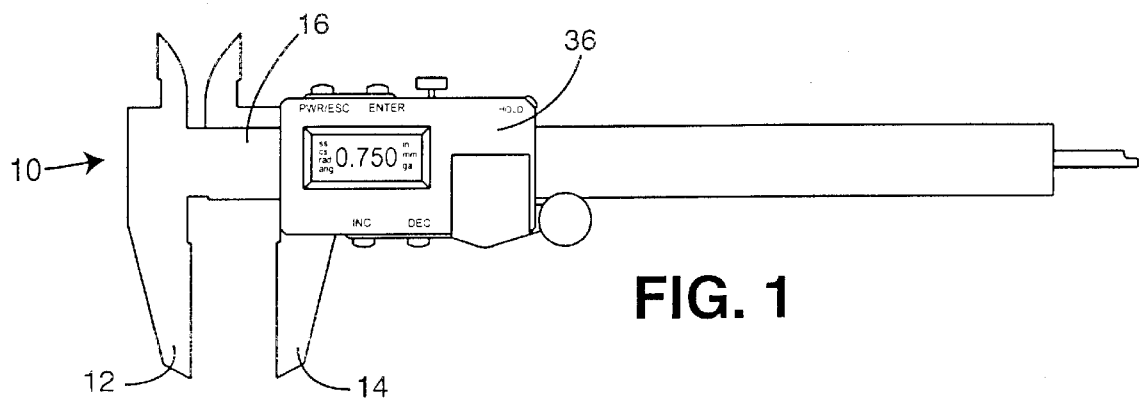
FIG. 1 is a front view of the electronic calipers of the present invention.
Figure 2:
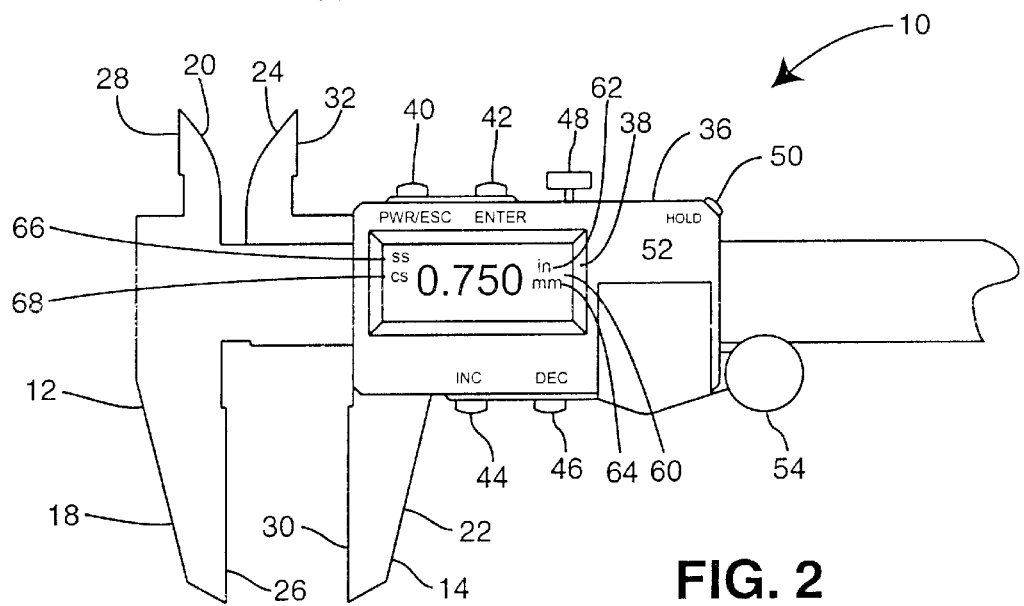
FIG. 2 is a front close-up view of the jaws and body of the electronic calipers displaying the scaling function.
Figure 3:
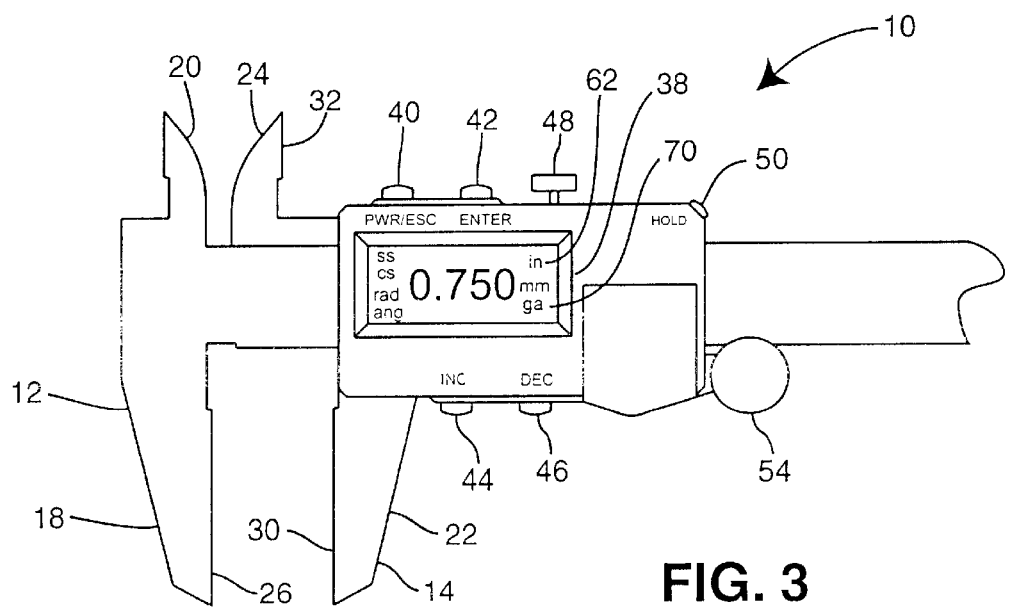
FIG. 3 is a front close-up view of the jaws and body of the electronic calipers displaying the nominal value and simple geometry functions.

FIGS. 1, 2, and 3 show the first embodiment of the electronic calipers 10 of the present invention. FIG. 1 is an overall side view of the calipers 10, and FIGS. 2 and 3 show different displays corresponding to some of the possible functions of the calipers 10. The electronic calipers 10 have a first jaw 12 and a second jaw 14. As the second jaw 14 moves along the guide rail 16, the calipers 10 measure the distance between the two jaws 12, 14. Although other jaw 12, 14 configurations may also be used, in the embodiment shown, the first jaw 12 has a first end 18 and a second end 20, and the second jaw 14 also has a first end 22 and a second end 24. The distance the calipers 10 measures is the space between the inner faces 26, 30 of the first ends 18, 22 of the first and second jaws 12, 14 or the distance between the outer faces 28, 32 of the second ends 20, 24 of the first and second jaws 12, 14. An optional thumb wheel 54 assist the user in moving the jaws 12, 14 in relation to one another.

Attached to the second jaw 14 of the calipers 10 is a calculation/display module 36 containing a digital display 38, four input buttons 40, 42, 44, 46, and a calculation module 52. The calipers also optionally include a hold button 50 to hold the digital value in the module 52 and a thumbscrew 48 to physically hold the jaws 12, 14 in a particular configuration. In standard mode, the digital display 38 indicates the value corresponding to the distance between the jaws 12, 14. The four input buttons include: a power button 40, an increment button 44, a decrement button 46, and a enter button 42. These buttons 40, 42, 44, 46 allow the user to access and use the scaling, nominal value, basic geometric and complex geometric functions of the present invention.

The preferred method for entry of numerical values is accomplished in two or three parts: the integer portion, the fractional portion and the units of the number, if necessary. The integer and fractional portions are input by scrolling up or down to the value and pressing the enter button 42 when a user reaches a point where numerical entry of a value is desired. Initially, the display 38 reads a flashing "0000." The user then presses the increment button 44 or the decrement button 46 to scroll to the desired value. Pressing the increment button 44 or the decrement button 46 once scrolls one unit. Continue holding either button 44, 46 down and the value scrolls slowly at first and jumps to faster speeds. Once the integer portion is reached, the enter button 42 is pressed. For example, if 10.50 is the required scale, the display 38 is scrolled to 10 and the enter button 42 is pressed. At this point, the display 38 reads a flashing "10.00." The user then scrolls the fractional portion up or down to 50. This scrolling works exactly as it did for the integer portion. When "10.50" is displayed, the enter button 42 is pressed, saving the value of 10.50 to memory. If necessary for a particular function, the units are then selected. For functions requiring units, after the enter button 42 is pressed, the units flag 60 flashes, thereby prompting the user to enter the units. The user toggles between units, i.e. English and metric by pressing the increment button 44 or the decrement button 46 and then pressing the enter button 42. If a mistake is made before the last enter 42 is pressed, the power button 40 can be pressed. This action allows the user to retain the last saved value to perform measurements or to restart the entry process.

Alternate designs could enter the data with more or less than the four buttons 40, 42, 44, 46 given in the embodiment shown. Also, numerically entered data could be entered may different ways, including, but not limited to, a numeric keypad, knobs, thumb screws, etc. Also, different strategies of entering the data other than integer and fraction could be employed, i.e. entering each digit and the location of the decimal point, keypad, scrolling the entire number, opening the jaws to display an exact number, etc.

In order to use the calipers 10, they first must be turned on, which is done by pressing the power button 40. Once the calipers 10 are on, the user selects a function by scrolling through the options with the increment button 44 and/or decrement button 46. For example, after the power button 40 is depressed, the last used mode will appear. The modes include the standard English measurement, the standard metric measurement, set scale, calculate scale, gauge, nominal value, radius, angle, area, etc. Once the desired mode is displayed, the user presses the enter button 42 to select the mode and proceeds with the necessary measurements as described below.

An alternate version of the calipers 10 have all of the modes categorized allowing the user to select a category, then select the specific function within the category. The categories currently envisioned include the standard measurement, scaling, nominal values, basic geometry, and complex geometry. For ease of explanation. The remainder of the description is broken in these groups for explanation and illustrative examples.

To use the standard measurement, the user selects the desired standard measurement, either English indicated by "in" 62 on the display 38 or metric indicated by a "mm" 64 on the display 38. Then, the user makes any desired measurements similar to the operation of a standard caliper. The jaws 12, 14 are used to precisely measure whatever is desired: the side of a part, an internal diameter, an external diameter, etc.

To use the scaling function, the user selects the desired scale mode, either the set scale function indicated by an "ss" 66 on the display 38 or the calculate scale function indicated by a "cs" 68 on the display 38. The set scale function is used when the user knows the exact scale required. For example, if the user wanted to scale all measured values by a factor of 1.5, he or she would select the set scale function, then enter the scale of 1.500 and select the proper units. Measurements taken after setting the scale would be multiplied by the scale factor and displayed. If the user measured a distance where the jaws 12, 14 of the calipers 10 were 2.000 inches apart, the display 38 would show 3.000 inches. This function would be especially useful for pattern makers, mold makers, architects and users that have drawings or patterns of a known scale.

The calculate scale mode is used when a drawing or photograph has an unknown or uncertain scale, but has at least one know dimension. First, the user selects the calculate scale mode. At this point, the calipers 10 display the last saved scaling factor. To begin entry of a new scale, the jaws 12, 14 are opened to a reference dimension from the item being measured and the enter button 42 is pressed to enter the reference dimension. On pressing the enter button 42, the calipers 10 save the actual distance the jaws 12, 14 are opened and flashes "0000" on the display 38. The user then enters the actual value of the dimension, either by setting the calipers 10 to the actual dimension and pressing the enter button 42, or by numerically entering the value as described above. No units are needed because the calculate scale mode is unitless and thus is automatically in the units of the entered dimension. The calipers 10 calculate the scale by dividing the actual entered value by the reference dimension entered. This scale is then multiplied by all other caliper jaw 12, 14 displacements to display values scaled by the scaling factor, thereby displaying values corresponding to actual values. This function is useful when working from incomplete date, i.e. photographs, brochures, facsimiles, sketches and other documents. This would be particularly valuable for reverse engineering, layouts, faxed drawings and drawings printed out of scale. As before, the power button 40 can be depressed at any time before the last entry and the last calculated scale factor is saved and the user can start again.

The nominal values function is used to determine the nearest nominal value which corresponds to a measured material. To use this function, the user selects the nominal value function which is indicated by a "ga" 70 on the display and the type of nominal value desired: wire gauge, sheet metal gauge, paper thickness, drill size, hole size, screw size, and font size. Then, when the jaws 12, 14 are used to measure a material, the nearest gauge or nominal value is displayed. Similar features could be added for other type of values Where a measurable value corresponds to a non-inch/non-metric number. These functions are preprogrammed look-up routines which display the nearest value in a pre-entered table of values. These functions would save the user from hauling around different scales and handbooks.

The other two function categories contain the geometric calculations. The first category contains the basic geometric equations for areas, circumference, volumes, perimeters, radius, etc. When one of these modes is selected, the calipers 10 prompt the user to enter the necessary measurement(s), then calculates and displays the desired resulting value. For example, if the area of a rectangle is to be determined, the user selects the area mode. The calipers 10 then prompt the user to measure a first length side of the rectangle, then measure a second length side of the rectangle. Once these two measurements are made, the calipers multiply the values together and displays the result, which is the area of the rectangle.

If the user wanted to determine the radius of curvature, the radius function is used. The calipers prompt the user to enter the appropriate units, then measure across the arc length and the arc height. The calculated radius of curvature is displayed in the selected units.

The angle function allows the user to calculate in degrees. When the user wishes to calculate a new angle, he or she opens the jaws 12, 14 to the adjacent length (x) and press the enter button 42, then opens the jaws 12, 14 to the opposite length (y) and press the enter button 42. The display 38 then shows the angle in degrees.

The complex geometry functions are a group of more complex geometrical calculations, i.e. area of more complex shapes, moments of inertia, areas under a curves, etc. For some of these functions, the calipers 10 make estimates to allow the user to obtain an approximate result for the desired value. These functions along with those listed above, would be included in a pair of calipers with an enlarged display, i.e. 1.5 inches by 2.0 inches. The data required and calculated could be presented in a pictorial fashion where the user could scroll through the required and desired values. Input for these function would be performed similar to the method for the basic geometric functions.

Figure 4:
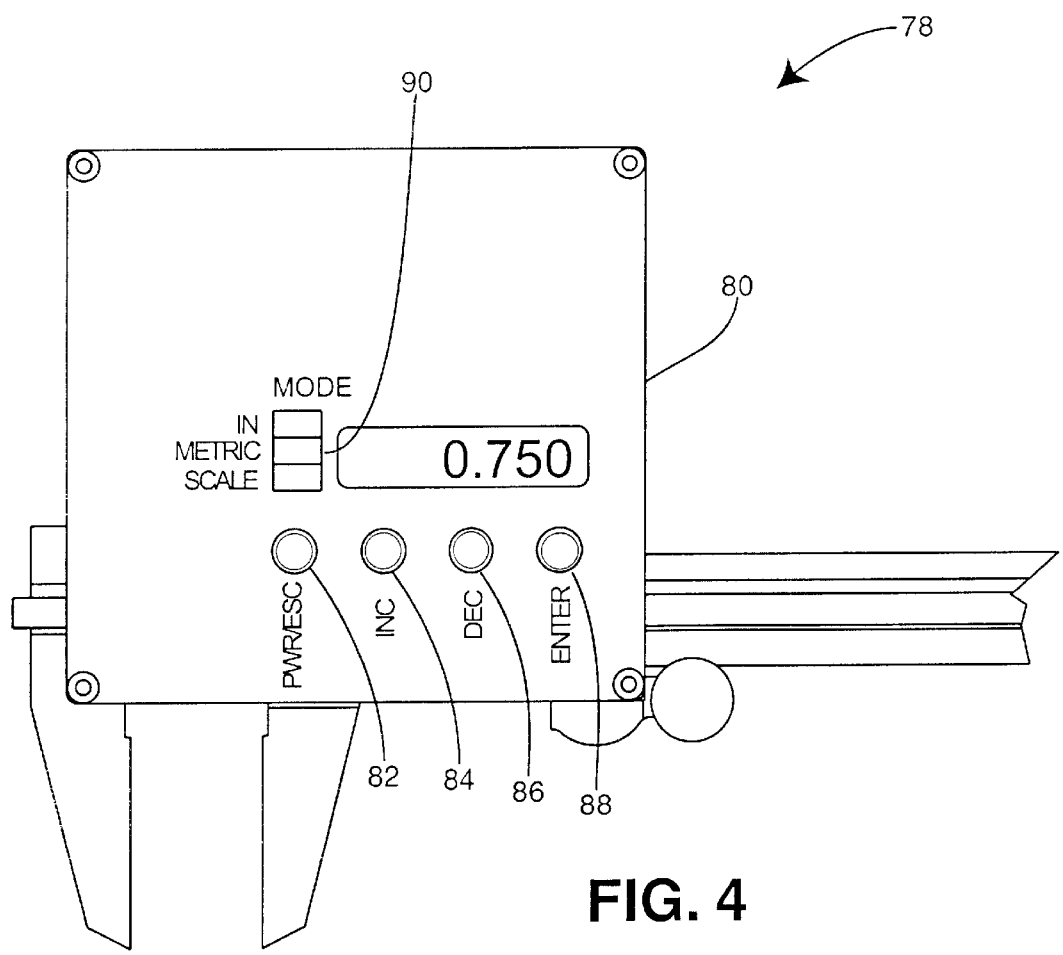
FIG. 4 is a front close-up view of the jaws and body of an alternate embodiment of calipers.

FIG. 4 is a front close-up view of the jaws 12, 14, body, and module 80 of an alternate calipers 78 embodiment. The input buttons 82, 84, 86, 88 are in a single line to allow easy access, and a slide switch 90 is used to select a mode, English, or metric units.

Figure 5:
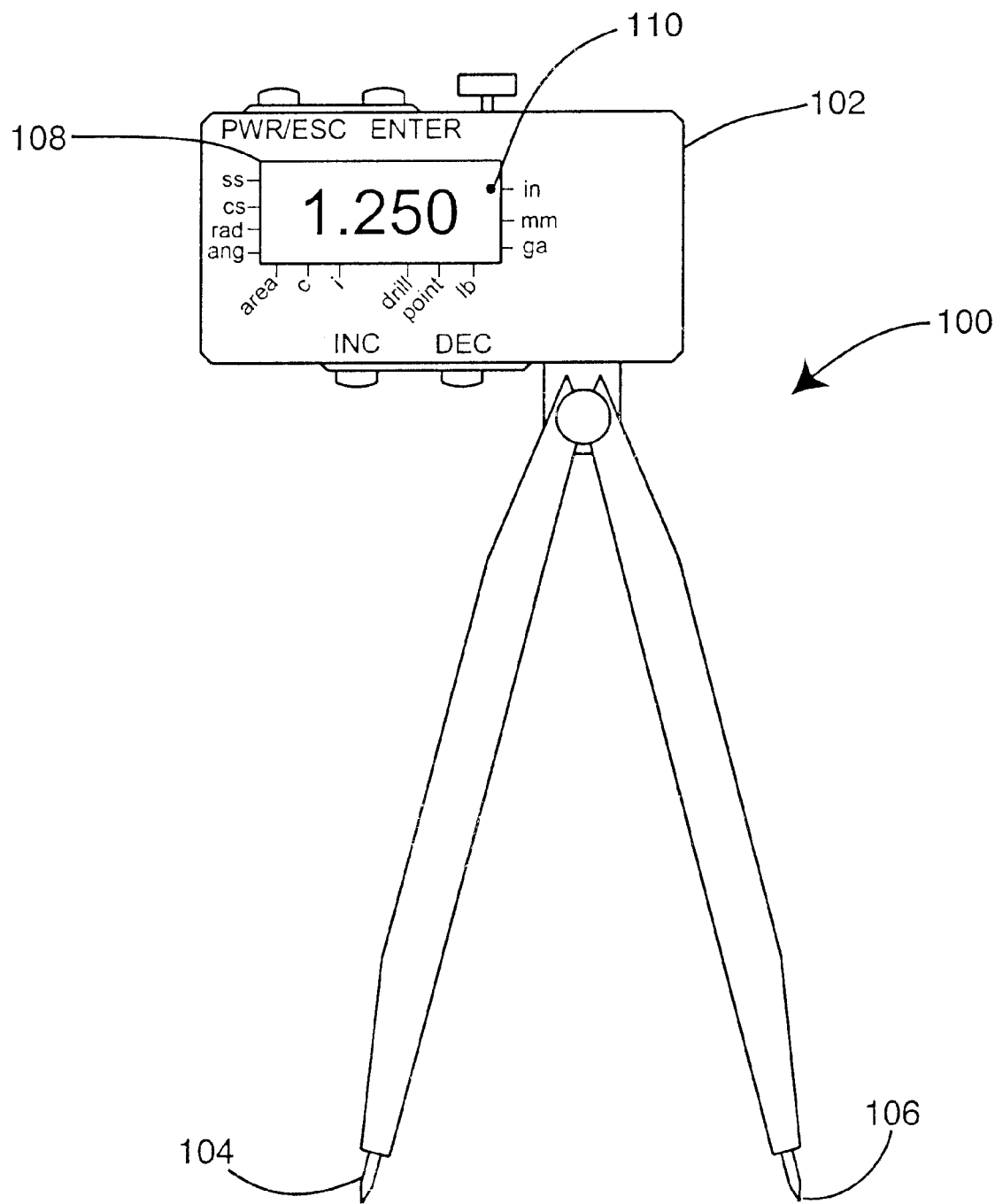
FIG. 5 is a front view of a dividers version of the present invention.

FIG. 5 is a front view of a dividers 100 version of the present invention. In this case, the module 102 is mounted on the upper portion of the pivotally connected dividers. The module 102 calculates the distance between the jaws or tips 104, 106 of the dividers 100 and uses this as the measured input. This device 100 can use the same set of functions as the embodiments above, including: standard measurement, scaling function, nominal value function, basic geometry function, and complex geometry function. The current display 108 is similar to existing calipers with the addition of bullets 110 that indicate which function is in use. Other methods could be used such as larger alpha-numeric display, LEDs, etc.

Alternate embodiments could also have interchangeable jaws for different types of measurement, i.e. internal holes. Also, it could have compass jaws allowing for drawing circles.

Many features have been listed with particular configurations, options, and embodiments. Any one or more of the features described may be added to or combined with any of the other embodiments or other standard devices to create alternate combinations and embodiments. The features of one of the functions may also be used with other functions. For example, a scaled measurement could be converted to a nominal value such as a wire gauge.

Although the examples given include many specificities, they are intended as illustrative of only one possible embodiment of the invention. Other embodiments and modifications will, no doubt, occur to those skilled in the art. Thus, the examples given should only be interpreted as illustrations of some of the preferred embodiments of the invention, and the full scope of the invention should be determined by the appended claims and their legal equivalents.

I claim:

1. A measurement and calculation device, comprising:
   a first jaw,
   a second jaw being movable in relation to said first jaw,
   a distance between said first jaw and said second jaw,
   and a calculation means for calculating chosen variables based said distance between said first jaw and said second jaw.

2. The measurement and calculation device of claim 1 further comprising a power button, an increment button, a decrement button, and an enter button, all of said buttons being electronically connected to said calculation means for inputting of values.

3. The measurement and calculation device of claim 1 further comprising a display device for displaying said chosen variables calculated by said calculation means.

4. The measurement and calculation device of claim 3 wherein said display device has a units display portion, a function display portion, and a mode display portion.

5. The measurement and calculation device of claim 1 further comprising:
   a measuring means for measuring and entering a dimension into said calculation means,
   a table of values within said calculation means,
   a comparison means for comparing said dimension to said table of values,
   and a display means for displaying a value from said table of values which corresponds most closely with said dimension.

6. The measurement and calculation device of claim 1 further comprising:

a selection means for selecting a geometric formula in said calculation means, a measuring means for measuring and entering at least one dimension into said geometric formula, and a display means for displaying a resultant value from said calculation means which corresponds the the result of said geometric formula.

7. The measurement and calculation device of claim 1 wherein said device is a pair of calipers.

8. The measurement and calculation device of claim 1 wherein said device is a pair of dividers.

9. A measurement and calculation device, comprising:

a guide rail, a first jaw fixedly attached to said guide rail, a second jaw slidably attached to said guide rail, a calculation means, comprising:
  a power button for engaging restarting said calculation means,
  a increment button for increasing and scrolling through values, variables, and functions,
  a decrement button for decreasing and scrolling though values, variables, and functions,
  an entry button for selecting a chosen values, variables, and functions, and a display, comprising:
    a mode display section for displaying a current mode of the calculation means,
    a value display section for displaying a current value in the calculation means,
    and a unit display section for displaying a current unit of measurement for the calculation means.

10. A method for obtaining a desired measured and mathematically modified value, comprising:

(a) determining a desired output variable;

(b) selecting a function having said desired output variable as a result;

(c) measuring and inputting one or more measured input values;

(d) automatically calculating said result;

(e) and displaying said result.

11. The method of claim 10 wherein step (c) is performed by:

(f) placing jaws of a pair of calipers at opposing edges of a distance to be measured;

(g) and pressing an enter button to enter said distance.

12. The method of claim 11 further comprising the step of:

(h) inputting one or more numerical input values.

13. The method of claim 12 wherein step (f) is performed by:

(i) scrolling through numerical values using an increment button and a decrement button;

(j) and entering the value shown on the display by pressing an enter button.

14. The method of claim 11 wherein step (g) is performed by:

(i) scrolling through numerical values using an increment button and a decrement button;

(j) and entering the value shown on the display by pressing an enter button.

15. The method of claim 11 wherein step (g) wherein said actual value is entered in two parts: an integer portion and a decimal portion.

16. The method of claim 10 further comprising the steps of:

(f) selecting a nominal value table;

(g) measuring an actual value;

(h) and displaying the nominal value which corresponds most closely to said actual value.

17. The method of claim 10 wherein said desired output variable is calculated using a geometric formula.

18. The method of claim 10 wherein said function is a geometric value, and wherein said geometric value is determined by the steps of:

(f) measuring at least one dimension;

(g) inputing said at least one dimension into a formula in a calculation means;

(h) automatically calculating a result from said formula;

(i) and displaying said result on a digital display.

\* \* \* \* \*